United States Patent
Davis et al.

(10) Patent No.: US 10,108,983 B2
(45) Date of Patent: Oct. 23, 2018

(54) SELECTING CONTENT FOR PRESENTATION TO AN ONLINE SYSTEM USER TO INCREASE LIKELIHOOD OF USER RECALL OF THE PRESENTED CONTENT

(71) Applicant: Facebook, Inc., Menlo Park, CA (US)

(72) Inventors: Nathan John Davis, Woodside, CA (US); Chinmay Deepak Karande, Mountain View, CA (US); David Rael Abelman, London (GB); Robert Oliver Burns Zeldin, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 427 days.

(21) Appl. No.: 14/986,675

(22) Filed: Jan. 2, 2016

(65) Prior Publication Data

US 2017/0193555 A1 Jul. 6, 2017

(51) Int. Cl.
*G06Q 30/00* (2012.01)
*G06Q 30/02* (2012.01)
*H04L 29/08* (2006.01)
*G06F 17/30* (2006.01)

(52) U.S. Cl.
CPC ... *G06Q 30/0264* (2013.01); *G06F 17/30867* (2013.01); *H04L 67/10* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 5,999,912 A | * | 12/1999 | Wodarz | G06Q 30/02 705/14.61 |
| 6,260,047 B1 | * | 7/2001 | Fox | G06Q 10/087 700/106 |
| 2006/0015893 A1 | * | 1/2006 | Kitsukawa | G06Q 20/387 725/23 |
| 2006/0031107 A1 | * | 2/2006 | Aihara | G06Q 10/04 705/7.28 |
| 2006/0206379 A1 | * | 9/2006 | Rosenberg | G06Q 30/02 705/14.54 |
| 2008/0040329 A1 | * | 2/2008 | Cussen | G06F 17/30867 |
| 2008/0052157 A1 | * | 2/2008 | Kadambi | G06Q 30/02 705/14.48 |
| 2008/0103887 A1 | * | 5/2008 | Oldham | G06Q 30/02 705/14.71 |

(Continued)

*Primary Examiner* — Matthew T Sittner
(74) *Attorney, Agent, or Firm* — Fenwick & West LLP

(57) ABSTRACT

An online system selects content items for a user to increase probabilities of the user remembering the content items after presentation. The online system generates one or more models based on information describing amounts of time users have viewed previously presented content items. Hence, a model associated with a user predicts an amount of time the user will view a content item. When selecting content items for the user, the online system selects one or more content items that the user is predicted to view for an amount of time within a specific range, which may be based on amounts of times other users have viewed the content item or content items similar to the content item. For example, the online system increases a probability of selecting a content item the user is predicted to view for an amount of time within the specific range.

16 Claims, 2 Drawing Sheets

(56) References Cited

U.S. PATENT DOCUMENTS

| | | | |
|---|---|---|---|
| 2008/0243756 A1* | 10/2008 | Moon | G06Q 30/02 |
| 2010/0050098 A1* | 2/2010 | Turner | G06F 17/30038 715/763 |
| 2011/0078718 A1* | 3/2011 | Jakobi | G06Q 10/00 725/14 |
| 2012/0191529 A1* | 7/2012 | Lewis | G06Q 30/02 705/14.41 |
| 2013/0091019 A1* | 4/2013 | Mallon | G06Q 30/0251 705/14.68 |
| 2013/0110949 A1* | 5/2013 | Maurel | G06Q 30/02 709/206 |
| 2013/0254787 A1* | 9/2013 | Cox | G06Q 30/02 725/13 |
| 2013/0325633 A1* | 12/2013 | McAfee | G06Q 30/02 705/14.68 |
| 2014/0129321 A1* | 5/2014 | Bruich | G06Q 30/0245 705/14.44 |
| 2014/0207793 A1* | 7/2014 | Liu | G06F 17/30864 707/748 |
| 2014/0236728 A1* | 8/2014 | Wright | G06Q 30/0272 705/14.58 |
| 2014/0244386 A1* | 8/2014 | Mathur | G06Q 30/0255 705/14.53 |
| 2014/0279069 A1* | 9/2014 | Rubinstein | G06Q 30/0277 705/14.73 |
| 2014/0280105 A1* | 9/2014 | Resende | G06F 17/30551 707/725 |
| 2015/0112790 A1* | 4/2015 | Wolinsky | G06Q 30/0238 705/14.38 |
| 2015/0127528 A1* | 5/2015 | Maksimow | G06F 17/30867 705/39 |
| 2015/0134460 A1* | 5/2015 | Tian | G06Q 30/0251 705/14.66 |
| 2015/0150035 A1* | 5/2015 | Chizi | H04N 21/44204 725/14 |
| 2015/0317666 A1* | 11/2015 | Pygnasak | G06Q 30/0226 705/14.27 |
| 2015/0356613 A1* | 12/2015 | Fang | G06Q 30/0265 705/14.62 |
| 2016/0007093 A1* | 1/2016 | Liu | G06Q 30/02 725/32 |
| 2016/0134934 A1* | 5/2016 | Jared | H04N 21/44213 725/14 |
| 2016/0292722 A1* | 10/2016 | Myers | G06Q 30/0247 |
| 2016/0350802 A1* | 12/2016 | Mehanian | G06Q 30/0254 |
| 2017/0024764 A1* | 1/2017 | Mooser | G06Q 30/0254 |
| 2017/0024770 A1* | 1/2017 | Abdulkader | G06Q 30/0269 |
| 2017/0024777 A1* | 1/2017 | Rajwat | G06Q 30/0275 |
| 2017/0193555 A1* | 7/2017 | Davis | G06Q 30/0264 |

* cited by examiner

SELECTING CONTENT FOR PRESENTATION TO AN ONLINE SYSTEM USER TO INCREASE LIKELIHOOD OF USER RECALL OF THE PRESENTED CONTENT

BACKGROUND

This disclosure relates generally to online systems, and more specifically to selecting content to online system users to increase likelihood of users later recalling the content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item.

As a relatively limited number of users of an online system may frequently interact with sponsored content provided by the online system, competition for presenting sponsored content to those users may result in larger amounts of compensation to the online system, which limits the number of users capable of providing the amounts of compensation. However, other online system users may view sponsored content for long amounts of time, which increases likelihoods of the users subsequently recalling the sponsored content and taking an action. For example, a user may make a purchase from a business identified by sponsored content the user views for greater than a particular amount of time even if the user does not interact with the sponsored content while it is presented. While users sponsoring content presented by an online system may obtain benefits from sponsored content presented by the online system but with which online system users do not interact, conventional online systems select sponsored content for presentation to users based on likelihoods of interaction with sponsored content. This may limit the sponsored content presented by an online system.

SUMMARY

An online system receives advertisement requests ("ad requests") that each include an advertisement for presentation to one or more users of the online system and a bid amount specifying an amount of compensation a user associated with an ad request provides the online system for presenting the advertisement from the ad request to another user. An ad request may also include targeting criteria specifying characteristics of users eligible to be presented with the advertisement included in the ad request. When the online system identifies an opportunity to present an advertisement from an ad request to a viewing user, the online system identifies ad requests eligible for presentation to the viewing user (i.e., ad requests including at least a threshold number of targeting criteria satisfied by characteristics of the viewing user) and selects an ad request from the identified ad requests. The online system then presents an advertisement from the selected ad request. For example, the online system includes the advertisement from the selected ad request in a feed of content selected for the viewing user by the online system.

In various embodiments, the online system maintains information identifying advertisements presented to the viewing user along with amounts of time that at least a threshold amount of the advertisements were presented to the viewing user via a client device. For example, the online system receives information from an application associated with the online system and executing on a client device specifying a time when a portion of an advertisement (e.g., a top boundary of the advertisement) is presented on a display of the client device and a time when a portion of an additional content item (e.g., a top boundary of the additional content item) stops being presented by the client device or when a portion of the advertisement stops being presented by the client device. In a specific example, the online system receives an identifier associated with a user and an identifier associated with an advertisement and a time when the top boundary of the advertisement is presented by the client device and subsequently receives a time when a top boundary of a content item presented in a lower position than the advertisement is no longer presented by the client device. The online system determines a difference between the time of presentation of the portion of the advertisement by the client device and the time the portion of the additional content item stops being presented as the duration the advertisement was presented to the user and stores the duration in association with the user and with the advertisement. As another example, the online system receives the identifier associated with the advertisement and the time when the top boundary of the advertisement is presented by the client device and subsequently receives a time when a lower boundary of the advertisement is no longer presented by the client device. The online system determines a difference between the time when the top boundary of the advertisement is presented and the time the bottom boundary of the advertisement as the duration the advertisement was presented to the user and stores the duration in association with the advertisement and with the user.

Based on durations of advertisements previously presented to the viewing user or other users having at least a threshold number or a threshold percentage of characteristics matching characteristics of the viewing user, the online system determines a likelihood of the viewing user viewing an advertisement for an amount of time within a specific range. The specific range includes amounts of time resulting in at least a threshold likelihood of the viewing user subsequently recalling the advertisement, which may increase the likelihood of the viewing user subsequently performing one or more actions associated with the advertisement (e.g., purchasing a product or service identified by the advertisement, accessing content identified by the advertisement, etc.). In various embodiments, the online system determines the specific range based on amounts of time that other users have viewed various advertisements. In some embodiments, the other users have at least a threshold number or a threshold percentage of characteristics (e.g., an age range, a location, a gender, etc.) matching characteristics of the user. For example, the specific range is includes amounts of time the other users have viewed the one or more advertisements between an upper boundary and a lower boundary in a ranking of the amounts of time the other users have viewed the one or more advertisements (e.g., amounts of time within the $75^{th}$ and $95^{th}$ percentile of amounts of times) the other users have viewed various advertisements. As a particular example, the specific range is between the $75^{th}$ and $95^{th}$ percentile of amounts of times that other users associated with a location matching a location of the viewing user have viewed the advertisement. In some embodiments, the online system determines the specific range based on amounts of times the other users viewed advertisements having one or more particular characteristics.

In various embodiments, the online system maintains a model associated with the viewing user that determines a predicted amount of time the viewing user will view an advertisement in an ad request. The model associated with the viewing user determines a predicted amount of time the viewing user will view an advertisement based on characteristics of the advertisement, amounts of time the user or other users viewed previously presented advertisements, and characteristics of the viewing user. For example, the model determines a predicted amount of time the viewing user will view an advertisement based on amounts of times other users viewed previously presented advertisements having characteristics matching characteristics of the advertisement. Alternatively or additionally, in some embodiments, the model determines a likelihood of a predicted amount of time the viewing user will view an advertisement being within the specific range.

When the online system identifies an opportunity to present one or more advertisements to the user, the online system identifies ad requests eligible for presentation to the user and determines predicted amounts of time the user will view advertisements in various identified ad requests. The online system selects an ad request including an advertisement for presentation to the user based in part on the predicted amounts of time the user will view advertisements in various identified ad requests. In various embodiments, the online system determines a score for the ad request including the advertisement based on a bid amount included in the ad request and a likelihood of the viewing user interacting with the advertisement and increases the score if the predicted amount of time the viewing user will view the advertisement is within the specific range. The online system similarly determines scores for other ad requests eligible for presentation to the viewing user and selects an ad request including an advertisement for presentation to the user based on the scores.

When an advertisement from the selected ad request is presented to the viewing user, the online system receives information identifying an amount of time the advertisement from the selected ad request was viewed by the user. The online system modifies the model associated with the user based on characteristics of the advertisement from the selected ad request and the amount of time the advertisement from the selected ad request was viewed by the viewing user. Additionally, the online system modifies the specific range of amounts of time for users having at least a threshold number or a threshold percentage of characteristics matching characteristics of the viewing user to view the advertisement from the selected ad request based on the amount of time the viewing user views the advertisement from the selected ad request.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
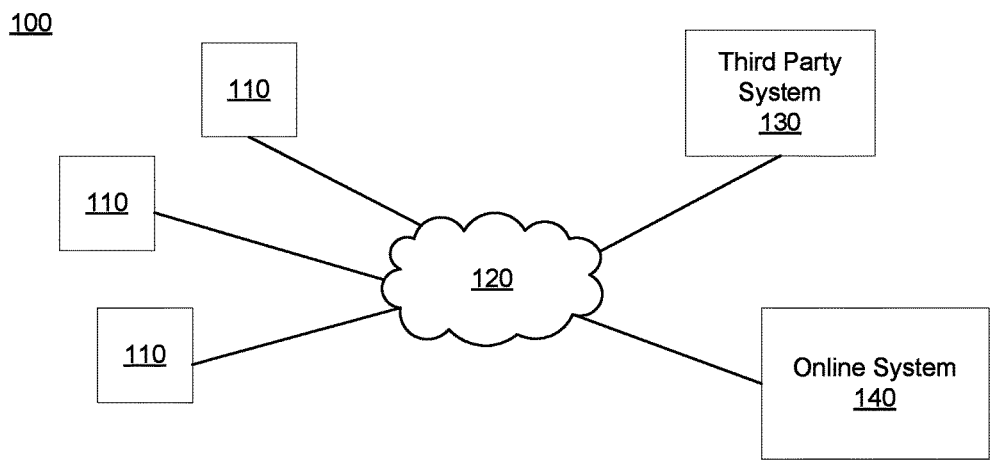
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing networks, or other system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
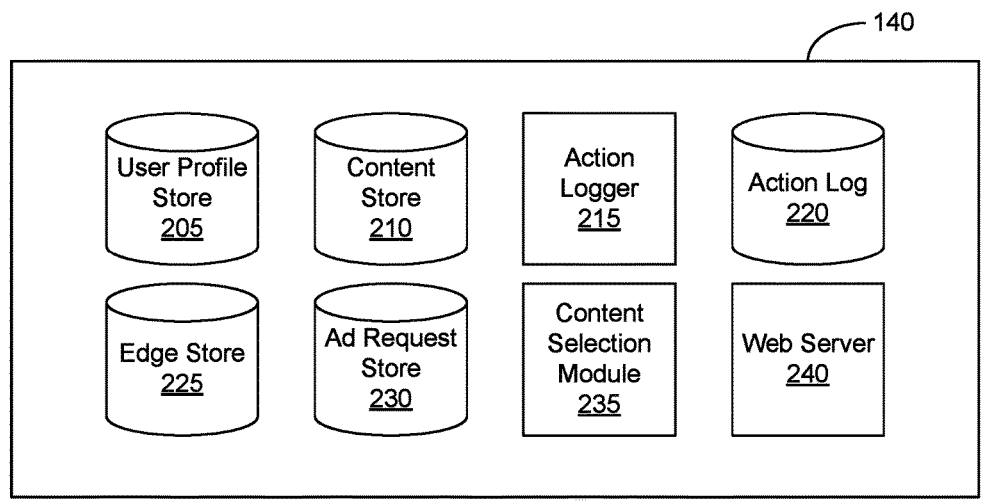
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In various embodiments, the action logger 215 receives information from an application associated with the online system 140 executing on various client devices 110 identifying times when content items were presented to users of the online system 140 by the client devices 110. For example, the action logger 215 receives a time when a portion of a content item was presented to a user by a client device 110 and a time when an additional portion of the content item stopped being presented to the user by the client device 110. In a specific example, the action logger 215 receives a time when a top boundary of a content item was presented by the client device 110 and a time when a lower boundary of the content item stopped being presented by the client device 110. Alternatively, the action logger 215 receives times when a portion of a content item was presented to a user by a client device 110 and when the portion of the content item stopped being presented to the user by the client device 110. For example, the action logger 215 receives times when top boundary of a content item was presented to a user by a client device 110 and when the top boundary of the content item stopped being presented to the user by the client device 110.

Based on the received information, the action logger 215 determines an amount of time a user viewed a content item and stores the amount of time in the action log 220 in association with an identifier of the content item and an identifier of the user. If the action logger 215 receives times when a portion of a content item was presented to a user by a client device 110 and a time when an additional portion of the content item stopped being presented to the user by the client device 110, the action logger 215 determines the amount of time the user viewed the content item as a difference between the time when the additional portion of the content item stopped being presented and the time when the portion of the content item was presented. For example, the amount of time the user viewed a content item is a difference between a time when a lower boundary of the content item stopped being presented by a client device 110 and a time when a top boundary of the content item was presented by the client device 110. If the action logger 215 receives times when a portion of a content item was presented to a user by a client device 110 and when the portion of the content item stopped being presented to the user by the client device 110, the action logger 215 determines an amount of time the user viewed the content item as a difference between a time when the portion of a content item having a lower position than the content item in a feed of content stopped being presented and a time when the portion of the content item was presented. For example, the amount of time the user views a content item is a difference between a time a client device 110 stopped presenting a top boundary of another content item having a position in the feed of content below a position of the content item (e.g., an adjacent position to the position of the content item in the feed) and a time the client device 110 presented the top boundary of the content item.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if the advertisement in the ad request receives a user interaction when presented, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 of presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

In various embodiments, the content selection module 235 maintains models associated with various users that determine predicted amounts of time users will view content items, such as advertisements. Hence, a model associated with a user predicts an amount of time the user will view a content item based on characteristics of the content item. The content selection module 235 determines a model associated with a user from amounts of times users having at least a threshold number or a threshold percentage of characteristics matching characteristics of the user have viewed content items. Hence, the model associated with the user determines a predicted amount of time the user will view a content item based on amounts of times users having at least the threshold number or at least the threshold percentage previously viewed content items having characteristics matching characteristics of the content item.

Additionally, the content selection module 235 determines specific ranges of times for various users to view a content item and subsequently recall the content item based on the amounts of times users viewed various content items from the action log 220. For example, a specific range includes amounts of time resulting in at least a threshold likelihood of a user subsequently recalling a content item after presentation of the content item, which may increase the likelihood of the user subsequently performing one or more actions associated with the content item (e.g., purchasing a product or service identified by the content item, accessing content identified by the content item, etc.). In some embodiments, the content selection module 235 determines a specific range of times for various groups of users, with each group having at least a threshold number or a threshold percentage of common characteristics. In various embodiments, the online system 140 ranks the amounts of time multiple users, such as users having at least the threshold number or the threshold percentage of common characteristics, have viewed content items and determines the specific range based on the ranking. For example, the specific range includes amounts of times between a lower boundary position in the ranking and an upper boundary position in the ranking. In a specific example, the online system 140 determines the specific range as times between a $75^{th}$ percentile and a $95^{th}$ percentile of amounts of times various users viewed content items.

When selecting advertisements, or other content items, for presentation to a user, the content selection module 235 accounts for a predicted amount of time the user will view various content items being within a specific range of times associated with the user. Presenting the user with a content item that the user is predicted to view for an amount of time sufficient for the user to subsequently recall the content item may increase the likelihood of the user subsequently performing an action associated with the content item. This increased likelihood of user interaction increases revenue provided to the online system 140 by users compensating the online system 140 for presenting content items. Selecting content items based at least in part on predicted amounts of time a user will view the content items is further described below in conjunction with FIG. 3.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

When video data provided by a user to the online system 140 is presented to an additional user of the online system 140, the content selection module 235 may select one or more ad requests from the ad request store 230 that include advertisements for presentation via the video data at different positions. To include advertisements in video data provided by the user while minimizing disruption of interaction with the video data, the content selection module 235 receives information from the user providing the video data to the online system 140 indicating positions in the video data capable of presenting an advertisement. For example, the user communicates information to the content selection module 235 identifying a time in the video data during which an advertisement is capable of being presented or identifying a time in the video data and a duration after the identified time during which one or more advertisements are capable of being presented. Additionally, the information received from the user who provided the video data to the online system 140 may also include information for selecting an ad request including an advertisement for presentation via the video data at an identified time. For example, the received information includes an identifier of a specific ad request in association with an identified time in the video data to present an advertisement from the specific ad request at the identified time in the video data. Alternatively, the received information includes information describing a context of the video data at an identified time capable of presenting an advertisement. For example, the received information identifies one or more keywords associated with an identified time of the video data, so the content selection module 235 selects an ad request including at least a threshold amount of targeting criteria satisfied by the keywords for presentation at the identified time. Additionally, the content selection module 235 may select an ad request for presentation at the identified time based at least in part on characteristics of an additional user presented with the video data by identifying one or more ad requests including at least a threshold amount of targeting criteria satisfied by received information from the user and characteristics associated with the additional user maintained by the online system 140. Selection of advertisements for presentation via video data provided by a user to the online system 140 is further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Selecting Advertisements Based in Part on Predicted User Viewing Time

Figure 3:
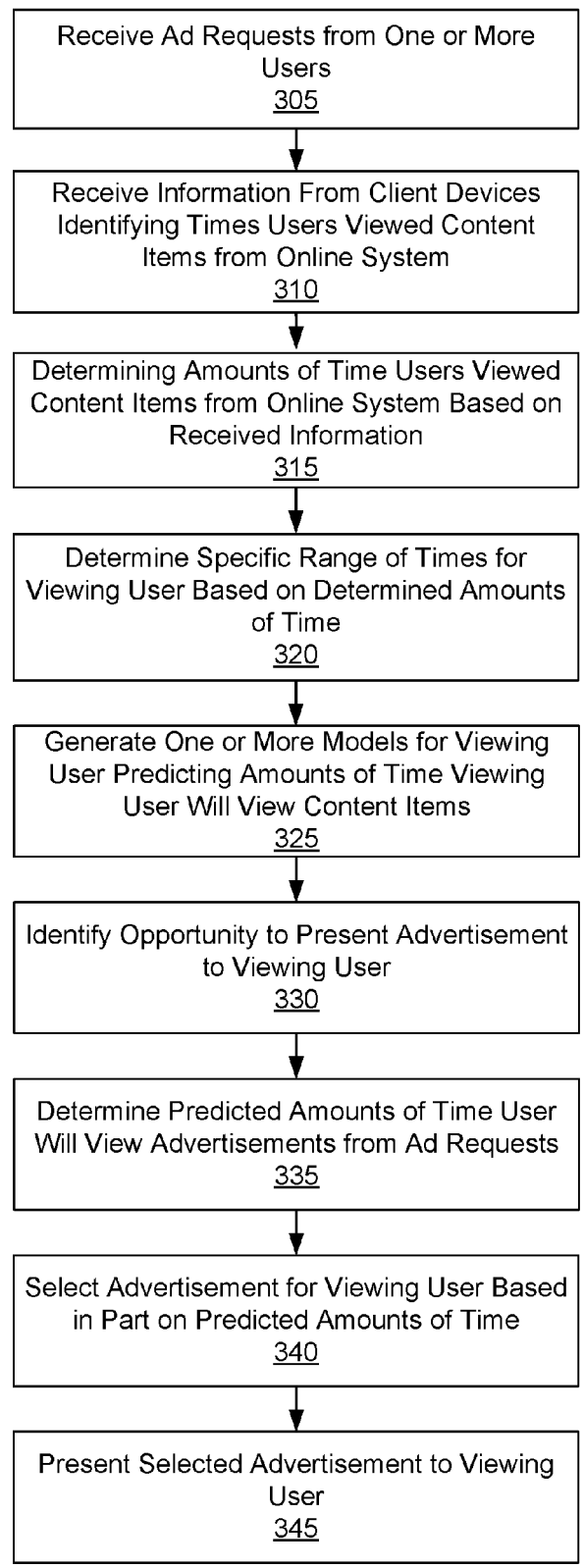
FIG. 3 is a flowchart of a method for d selecting advertisements for presentation to a viewing user based on a predicted amount of time the viewing user will view advertisements, in accordance with an embodiment.

FIG. 3 is a flowchart of one embodiment of a method for selecting advertisements for presentation to a viewing user based on a predicted amount of time the viewing user will view advertisements. In other embodiments, the method may include different and/or additional steps than those shown in FIG. 3. Additionally, steps of the method may be performed in different orders than the order described in conjunction with FIG. 3 in various embodiments.

An online system 140 receives 305 advertisement requests ("ad requests") from one or more users. As described above in conjunction with FIG. 2, each ad request includes an advertisement for presentation to one or more users of the online system 140 and a bid amount specifying an amount of compensation a user associated with an ad request provides the online system 140 in exchange presenting the advertisement from the ad request to another user or in exchange for another user interacting with the advertisement when it is presented. An ad request may also include targeting criteria specifying characteristics of users eligible to be presented with the advertisement included in the ad request, as described above in conjunction with FIG. 2.

Additionally, the online system 140 receives 310 information from various client devices 110 presenting content from the online system 140 identifying times online system users viewed content items from the online system 140. In various embodiments, an application associated with the online system 140 executes on a client device 110 and presents content items from the online system 140 to a user via the client device 110. When the application associated with the online system 140 presents a portion of a content item, such as an advertisement, the application communicates an identifier associated with the user, an identifier associated with the content item, and a time when the portion of the content item was presented on a display device of the client device 110 by the application to the online system 140. For example, when a top boundary of an advertisement is presented to a user by the display device of the client device 110, the application associated with the online system 140 communicates information identifying the user, identifying the advertisement, and the time when the top boundary of the advertisement was presented to the online system 140. In some embodiments, the application also communicates a time when an additional portion of the content item stops being presented by the display device of the client device 110 along with the identifier associated with the user and the identifier associated with the content item. For example, the online system 140 receives 310 a time when a bottom boundary of the advertisement stops being presented by the display device of the client device 110. Alternatively, the application associated with the online system 140 communicates times when the he application also communicates a time when the portion of various content items stops being presented by the display device of the client device 110. For example, the application communicates times when a top boundary of each content item from the online system 140 stops being presented by the display device of the client device 110 along with identifiers associated with the content items and an identifier associated with the user.

Based on the received information, the online system 140 determines 315 amounts of times various content items, such as advertisements, were presented to one or more users. When the online system 140 receives a time when a portion of a content item was presented to a user by a client device 110 and a time when an additional portion of the content item stopped being presented to the user by the client device 110, the online system 140 determines 315 an amount of time the content item was presented to the user as a difference between the time when the additional portion of the content item stopped being presented to the user and the time when the portion of the content item was presented to the viewing user. For example, the online system 140 determines 315 the amount of time an advertisement was presented to the user as a difference between a time when a bottom boundary of the advertisement stopped being presented to the user and a time when a top boundary of the advertisement was presented to the user. When the online system 140 receives a time when a portion of a content item was presented to the user by a client device 110 and a time when the portion of the content item stopped being presented to the user by the client device 110, the online system 140 determines 315 the amount of time a content item was presented to the user as a difference between a time when the portion of the content item was presented to the user and a time when the portion of an additional content item adjacent to the content item stopped being presented to the user. For example, the online system 140 determines 315 the amount of time an advertisement was presented to the user as a difference between a time when a top boundary of a content item adjacent to the advertisement stopped being presented to the user and a time when the top boundary of the advertisement was presented to the user.

In various embodiments, the one or more users for whom the online system 140 determines the amounts of times various content items were presented to the users include a viewing user. For various content items, the online system 140 stores an identifier of a content item and an amount of time the content item was presented to the viewing user in association with the viewing user. The online system 140 maintains amounts of times different users have viewed different content items. In some embodiments, the online system 140 maintains amounts of times each user have viewed content items presented to the users within a threshold amount of time from a current time.

Based on amounts of times various users have viewed different content items, the online system 140 determines 320 a specific range of times for the viewing user. In some embodiments, the online system 140 determines a specific range of time for a set of users having at least a threshold number or a threshold percentage of characteristics matching characteristics of the viewing user. The specific range of times includes amounts of time for presenting a content item to the viewing user causing the viewing user to subsequently recall the content item and perform one or more actions. For example, the specific range includes amounts of time resulting in at least a threshold likelihood of the viewing user subsequently recalling the content item after presentation of the content item, which may increase the likelihood of the viewing user subsequently performing one or more actions associated with the content item (e.g., purchasing a product or service identified by the content item, accessing content identified by the content item, etc.). In various embodiments, the online system 140 ranks the amounts of time multiple users have viewed content items and determines 320 the specific range based on the ranking. For example, the specific range includes amounts of times between a lower boundary position in the ranking and an upper boundary position in the ranking. In a specific example, the online system 140 determines 320 the specific range as times between a $75^{th}$ percentile and a $95^{th}$ percentile of amounts of times various users viewed content items.

The online system 140 may determine 320 the specific range based on amounts of time that users in a set viewed content items. In various embodiments, users in the set have at least a threshold number of characteristics matching characteristics of the viewing user. For example, users in the set each have a gender or a location matching a gender or a location of the viewing user, so the online system 140 determines 320 the specific range based on amounts of time that users having a common gender or a common location with the viewing user have viewed content items. Any suitable characteristic or combination of characteristics may be used by the online system 140 to identify the set of users. In some embodiments, the online system 140 determines a specific range for multiple sets of users, with each set including users having a different common characteristic or a different combination of common characteristics. The online system 140 stores the specific range in association with the users in the set or in association with an identifier of the set that is associated with identifiers of users included in the set.

Additionally, the online system 140 generates 325 one or more models associated with the viewing user based on the amounts of times users have viewed different content items. A model associated with the viewing user determines an estimated amount of time the viewing user will view a content item, such as an advertisement, based on characteristics of the viewing user and characteristics of the content item. The online system 140 may generate 325 a model associated with the viewing user based on amounts of time other users having at least a threshold number or a threshold of percentage of characteristics matching characteristics of the viewing user and characteristics of content items viewed by the other users. The model may also account for amounts of time the viewing user has viewed content items and characteristics of the content items previously viewed by the viewing user. In some embodiments, the model determines predicted amounts of time the user will view specific types of content items, such as advertisements, based on amounts of time that the other users have viewed the specific types of content items, characteristics of the viewing user, and amounts of time the viewing user or other users have viewed previously presented content items, a model associated with the viewing user determines a predicted amount of time the viewing user will view the content item. The online system 140 stores the generated model in association with the viewing user.

When the online system 140 identifies 330 an opportunity to present an advertisement from an ad request to the viewing user, the online system 140 identifies ad requests eligible for presentation to the viewing user (i.e., ad requests including at least a threshold number of targeting criteria satisfied by characteristics of the viewing user) and determines 335 a predicted amount of time the user will view advertisements from various identified ad requests. In various embodiments, the online system 140 determines 335 a predicted amount of time the viewing user will view an advertisement from each identified ad request. For example, the online system 140 applies the one or more models associated with the viewing user to advertisements from each identified ad request to determine 335 the predicted amounts of time the viewing user will view each of the advertisements from the identified ad requests. The model determines 335 a predicted amount of time the viewing user will view an advertisement from an identified ad request based on amounts of times the other users or the viewing user have viewed advertisements having characteristics matching characteristics of the advertisement from the identified ad request.

In various embodiments, the online system 140 determines scores for each identified ad request. A score for an identified is based on a bid amount included in the ad request, a likelihood of the viewing user interacting with the advertisement in the ad request, and the predicted amount of time the user will view the advertisement in the ad request. For example, the online system 140 determines a score for the ad request by combining the bid amount included in the ad request and increasing the score if the predicted amount of time the viewing user will view the advertisement from the ad request is within the specific range. Based on the scores for various identified ad requests, the online system 140 selects 340 an ad request including an advertisement for presentation to the viewing user based on the scores, such as described above in conjunction with FIG. 2. By increasing the scores for ad requests including advertisements the user is predicted to view for times within the specific range, the online system 140 increases a probability of the user being presented with an advertisement that the user will view for an amount of time that causes the user to subsequently recall the advertisement.

Alternatively, the online system 140 generates a set of identified ad requests including advertisements predicted to be viewed by the user for amounts of time within the specific range and selects an and increases the score if the predicted amount of time the viewing user will view the advertisement is within the specific range. The online system 140 selects 340 an ad request from the set of ad requests based on their bid amounts. For example, the online system selects 340 an ad request form the set having at least a threshold bid amount or having a maximum bid amount; in another example, the online system 140 ranks ad requests in the set based on their bid amounts and selects 340 an ad request having at least a threshold position in the ranking. Hence, the online system 140 selects 340 an ad request including an advertisement for which a predicted amount of time the viewing user will view the advertisement in the selected ad request is within the specific range of times.

In some embodiments, the one or more models associated with the viewing user determine a likelihood of the viewing user viewing a content item for an amount of time within the specific range. The online system 140 may determine scores for identified ad requests based on bid amounts included in the identified ad requests and likelihoods of the viewing user viewing advertisements in the identified ad requests for an amount of time within the specific range. For example, the online system 140 determines a score for an identified ad request as a product of a bid amount included in the identified ad request and a likelihood of the viewing user viewing an advertisement from the identified ad request for an amount of time within the specific range. The online system 140 then selects 340 an identified ad request based on the scores. For example, the online system 140 selects 340 an identified ad request having at least a threshold score. Alternatively, the online system 140 ranks the identified ad requests based on their scores and selects 340 an identified ad request having at least a threshold position in the ranking.

The online system 140 presents 345 an advertisement from the selected ad request to the viewing user. For example, the online system 140 includes the advertisement from the selected ad request in a feed of content that is communicated by the online system 140 to a client device 110 associated with the viewing user, which presents the feed of content, including the advertisement, to the viewing user. When the advertisement from the selected ad request is presented to the viewing user, the online system 140 receives information from an application associated with the online system 140 executing on the client device 110 identifying an amount of time the advertisement was viewed by the user, as further described above. Based on the amount of time the viewing user viewed the advertisement, the online system 140 modifies the one or more models associated with the viewing user. Additionally, the online system 140 modifies the specific range of amounts of time for users having at least a threshold number or a threshold percentage of characteristics matching characteristics of the viewing user to view the advertisement from the selected ad request based on the amount of time the viewing user views the advertisement from the selected ad request.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
for each advertisement in a set of advertisements, determining, by a remote server of an online system, an amount of time each user in a set of users viewed the advertisement at a client device associated with the user, based on information received from the client device;
determining, by the remote server, a specific range of times, wherein amounts of time within the specific range of times result in at least a threshold likelihood that a user who is presented an advertisement for the amount of time subsequently recalls the presented advertisement;
generating, by a model training process running on the remote server, a model predicting an amount of time a viewing user will view a presented advertisement at the client device based on determined amounts of times at least a subset of the set of users viewed at least a subset of advertisements in the set of advertisements, characteristics of each advertisement in the set of advertisements, and characteristics of the viewing user;
receiving advertisement requests ("ad requests") at the remote server, each ad request including an advertisement for presentation to one or more users of the online system at one or more client devices;
identifying, by a content selection process running on the remote server, an opportunity to present one or more advertisements to the viewing user at a client device associated with the viewing user;

retrieving, from an ad request data store on the online system, ad requests eligible for presentation to the viewing user at the client device;

determining, by the content selection process using the generated model, predicted amounts of time the viewing user will view advertisements in each of the identified ad requests, where the predicted amounts of time are determined by determining a likelihood that the viewing user will view an advertisement from an identified ad request is within the specific range; and selecting, by the content selection process, for presentation to the client device of the viewing user, an ad request including an advertisement for which a predicted amount of time the viewing user will view the advertisement is within the specific range of times, where the selecting comprises determining scores for each identified ad request, a score for the identified ad request based on a bid amount included in the identified ad request specifying an amount of compensation the online system receives for presenting an advertisement in the identified ad request and the likelihood the predicted amount of time the viewing user will view the advertisement from an identified ad request is within the specific range, and selecting the ad request based at least in part on the scores for the identified ad requests; and sending the advertisement of the selected ad request from the remote server of the online system for display to the client device of the viewing user.

2. The method of claim 1, wherein determining a specific range of times for a viewing user to view a presented advertisement and subsequently recall the presented advertisement determining, by the remote server, the specific range of times further comprises:

ranking the amount of time each user in at least the subset of users viewed each of the one or more advertisements; and selecting the specific range of times for the viewing user based on the ranking.

3. The method of claim 2, wherein selecting the specific range of times for the viewing user based on the ranking comprises:

selecting the specific range of times as amounts of time having positions in the ranking between a lower boundary position and an upper boundary position.

4. The method of claim 3, wherein the lower boundary position is a $75^{th}$ percentile and the upper boundary position is a $95^{th}$ percentile.

5. The method of claim 2, wherein the set of users includes users having at least a threshold number of characteristics matching characteristics of the viewing user.

6. The method of claim 1, wherein generating the model predicting the amount of time the viewing user will view the presented advertisement based on determined amounts of times at least the subset of the users viewed each of the one or more advertisements generating, by the remote server, the model predicting the amount of time the viewing user will view a presented advertisement at the client device further comprises:

generating the model based on amounts of times of users having at least a threshold number of characteristics matching characteristics of the viewing user, and based on characteristics of advertisements viewed by the users having at least a threshold number of characteristics matching characteristics of the viewing user.

7. The method of claim 6, wherein the model is further generated based at least in part on an amount of time the viewing user has viewed each of one or more advertisements, and characteristics of each of the one or more advertisements viewed by the viewing user.

8. The method of claim 1, wherein the generated model generates a likelihood that a predicted amount of time the viewing user will view the presented advertisement is within the specific range.

9. A computer program product comprising a non-transitory computer readable storage medium having instructions encoded thereon that, when executed by a processor, cause the processor to:

for each advertisement in a set of advertisements, determine, by a remote server of an online system, an amount of time each user in a set of users viewed the advertisement at a client device associated with the user, based on information received from the client device;

determine, by the remote server, a specific range of times, wherein amounts of time within the specific range of times result in at least a threshold likelihood that a user who is presented an advertisement for the amount of time subsequently recalls the presented advertisement;

generate, by the remote server, a model training process running on the remote server, a model predicting an amount of time a viewing user will view a presented advertisement at the client device based on determined amounts of times at least a subset of the set of users viewed at least a subset of advertisements in the set of advertisements, characteristics of each advertisement in the set of advertisements, and characteristics of the viewing user;

receive advertisement requests ("ad requests") at the remote server, each ad request including an advertisement for presentation to one or more users of the online system at one or more client devices;

identify, by a content selection process running on the remote server, an opportunity to present one or more advertisements to the viewing user at a client device associated with the viewing user;

retrieve, from an ad request data store on the online system, ad requests eligible for presentation to the viewing user at the client device;

determine, by the content selection process using the generated model, predicted amounts of time the viewing user will view advertisements in each of the identified ad requests, where the predicted amounts of time are determined by determining a likelihood that the viewing user will view an advertisement from an identified ad request is within the specific range; and select, by the content selection process, for presentation to the client device of the viewing user, an ad request including an advertisement for which a predicted amount of time the viewing user will view the advertisement is within the specific range of times, where the selecting comprises determining scores for each identified ad request, a score for the identified ad request based on a bid amount included in the identified ad request specifying an amount of compensation the online system receives for presenting an advertisement in the identified ad request and the likelihood the predicted amount of time the viewing user will view the advertisement from an identified ad request is within the specific range, and selecting the ad request based at least in part on the scores for the identified ad requests; and send the advertisement of the selected ad request from the remote server of the online system for display to the client device of the viewing user.

10. The computer program product of claim 9, wherein determine a specific range of times for a viewing user to view a presented advertisement and subsequently recall the presented advertisement determine, by the remote server, a specific range of times comprises:

rank the amount of time each user in at least the subset of users viewed each of the one or more advertisements; and select the specific range of times for the viewing user based on the ranking.

11. The computer program product of claim 10, wherein select the specific range of times for the viewing user based on the ranking comprises:

select the specific range of times as amounts of time having positions in the ranking between a lower boundary position and an upper boundary position.

12. The computer program product of claim 11, wherein the lower boundary position is a $75^{th}$ percentile and the upper boundary position is a $95^{th}$ percentile.

13. The computer program product of claim 10, wherein the set of users includes users having at least a threshold number of characteristics matching characteristics of the viewing user.

14. The computer program product of claim 9, wherein generate the model predicting the amount of time the viewing user will view the presented advertisement based on determined amounts of times at least the subset of the users viewed each of the one or more advertisements generate, by the remote server, the model predicting the amount of time the viewing user will view a presented advertisement at the client device further comprises:

generate the model based on amounts of time users having at least a threshold number of characteristics matching characteristics of the viewing user, and based on characteristics of advertisements viewed by the users having at least a threshold number of characteristics matching characteristics of the viewing user.

15. The computer program product of claim 14, wherein the model is further generated based at least in part on an amount of time the viewing user has viewed each of one or more advertisements, and characteristics of each of the one or more advertisements viewed by the viewing user.

16. The computer program product of claim 9, wherein the generated model generates a likelihood of a predicted amount of time the viewing user will view the presented advertisement is within the specific range.

* * * * *

UNITED STATES PATENT AND TRADEMARK OFFICE
CERTIFICATE OF CORRECTION

PATENT NO. : 10,108,983 B2
APPLICATION NO. : 14/986675
DATED : October 23, 2018
INVENTOR(S) : Nathan John Davis et al.

Page 1 of 1

It is certified that error appears in the above-identified patent and that said Letters Patent is hereby corrected as shown below:

In the Claims

Column 22, Claim 16, Line 4: delete "view the presented advertisement is within the specific range" and insert -- view the presented advertisement within the specific range --.

Signed and Sealed this
Second Day of April, 2019

Andrei Iancu
*Director of the United States Patent and Trademark Office*